US012270628B1

(12) United States Patent
Stolle et al.

(10) Patent No.: US 12,270,628 B1
(45) Date of Patent: Apr. 8, 2025

(54) TIME SYNCHRONIZATION OF OPTICS USING POWER FEEDS

(71) Applicant: BAE SYSTEMS Information and Electronic Systems Integration Inc., Nashua, NH (US)

(72) Inventors: Frank R Stolle, Amherst, MA (US); Simone B. Bortolami, Belmont, MA (US); Larry H Mack, Pflugerville, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 36 days.

(21) Appl. No.: 18/474,817

(22) Filed: Sep. 26, 2023

(51) Int. Cl.
*F41G 3/06* (2006.01)
*F41G 3/08* (2006.01)
*G06G 7/80* (2006.01)

(52) U.S. Cl.
CPC ............... *F41G 3/065* (2013.01); *F41G 3/08* (2013.01); *G06G 7/80* (2013.01)

(58) Field of Classification Search
CPC .............. F41G 3/065; F41G 3/08; G06G 7/80
USPC .......................................................... 235/404
See application file for complete search history.

(56) References Cited

U.S. PATENT DOCUMENTS 9,766,074 B2 9/2017 Roumeliotis
10,012,504 B2 7/2018 Roumeliotis
10,107,919 B1 * 10/2018 Chapman ................ G01S 19/35
10,151,588 B1 12/2018 Singh
10,254,118 B2 4/2019 Roumeliotis
10,325,411 B1 6/2019 Laney
10,366,549 B1 7/2019 Mash
10,694,148 B1 6/2020 Li
10,907,971 B2 2/2021 Roumeliotis
10,929,713 B2 2/2021 Chiu
11,466,990 B2 10/2022 Roumeliotis (Continued)

FOREIGN PATENT DOCUMENTS

WO WO-2016174659 A1 * 11/2016 ............. G06F 1/163

OTHER PUBLICATIONS

DelMarco, S., Webb, H., and Tom, V., "Spectrally-Shaped Correlation with Application to Image Registration," Proceedings of SPIE, vol. 10993, 2019.

(Continued)

*Primary Examiner* — Toan C Ly
(74) *Attorney, Agent, or Firm* — Maine, Cernota & Curran

(57) ABSTRACT

A weapon-mountable smart optic comprising: a time reference configured to output a signal comprising a periodically-repeating feature and time metadata and comprising a first oscillator; at least two sensors configured to gather data, each comprising secondary oscillators; and at least one processor in communication with each of the at least two sensors; wherein each of the at least two sensors is in operative communication with the time reference and is configured to associate an edge of the periodically-repeating signal with a time conveyed by the time metadata, and wherein each of the at least two sensors is configured to gather data, associate time metadata with the gathered data, and to send the gathered data with time metadata to the at least one processor, and wherein the at least one processor is configured to fuse the data gathered by each of the at least two sensors.

20 Claims, 7 Drawing Sheets

(56) References Cited

U.S. PATENT DOCUMENTS

| | | | | |
|---|---|---|---|---|
| 11,544,161 | B1 | 1/2023 | Yarlagadda | |
| 2007/0070069 | A1 | 3/2007 | Samarasekera | |
| 2011/0218733 | A1 | 9/2011 | Hamza | |
| 2013/0314509 | A1 | 11/2013 | Laine | |
| 2015/0286217 | A1 | 10/2015 | Qian | |
| 2017/0329335 | A1 | 11/2017 | Delmarco | |
| 2018/0091746 | A1 | 3/2018 | Benser | |
| 2019/0051056 | A1 | 2/2019 | Chiu | |
| 2019/0368877 | A1 | 12/2019 | O'Shea | |
| 2021/0048821 | A1 | 2/2021 | Bondurant | |
| 2022/0065571 | A1* | 3/2022 | Canty | H04N 23/60 |

OTHER PUBLICATIONS

DelMarco, S., Webb, H., and Tom, V., "A Progressive Refinement Approach to Aerial Image Registration Using Local Transform Perturbations," Proceedings of the IEEE International Geoscience and Remote Sensing. Symposium, vol. 2, pp. 1100-1103, 2008.

DelMarco, S., "Multi-Template Image Matching Using Alpha-Rooted Biquaternion Phase Correlation with Application to Logo Recognition," Proceedings of SPIE, vol. 8063, 2011.

DelMarco, S., "Multiple Template-Based Image Matching Using Alpha-Rooted Quaternion Phase Correlation," Proceedings of SPIE, vol. 7708, 2010.

DelMarco, S., "Logo Recognition Using Alpha-Rooted Phase Correlation in the Radon Transform Domain," Proceedings of SPIE, vol. 7443, 2009.

DelMarco, S., Tom, V., Webb, H., and Lefebvre, D., "A Verification Metric for Multi-Sensor Image Registration," Proceedings of SPIE, vol. 6567, 2007.

DelMarco, S., Webb, H., and Tom, V., "Automatic Spatial Accuracy Estimation for Correlation-Based Image Registration," Proceedings of SPIE, vol. 10993, 2019.

Naman Patel et al. "Sensor Modality Fusion with CNNs for UGV Autonomous Driving Indoor Environments" 8 pages.

Shahram Moafipoor et al. "LiDAR/Camera Point & Pixel Aided Autonomous Navigation" LiDAR Magazine, vol. 7 No. 7, 7 pages, https://lidarmag.com/2017/10/25/lidarcamera-point-pixel-aided-autonomous-navigation/.

Qi Kong et al. "Outdoor real-time RGBD sensor fusion of stereo camera and sparse lidar" (2022) J. Phys.: Conf. Ser. 2234 012010, doi:10.1088/1742-6596/2234/1/012010.

Darshan Bhanushali et al. "LiDAR-Camera Fusion for 3D Object Detection" in Proc. IS&T Int'l. Symp. on Electronic Imaging: Autonomous Vehicles and Machines, 2020, pp. 257-1-257-9, https://doi.org/10.2352/ISSN.2470-1173.2020.16.AVM-257.

Yilin Zhang "Lidar—camera deep fusion for end-to-end trajectory planning autonomous vehicle" 2022 J. Phys.: Conf. Ser. 2284 012006, retrieved from the internet: https://iopscience.iop.org/article/10.1088/1742-6596/2284/1/012006, DOI: 10.1088/1742-6596/2284/1/012006.

Anderson Lebbad, C. Nataraj "A Bayesian Alogorithm for Vision Based Navigation of Autonomous Surface Vehicles" 2015 IEEE 7th International Conference on Cybernetics and Intelligent Systems (CIS) and IEEE Conference on Robotics, Automation and Mechatronics (RAM), Siem Reap, Cambodia, 2015, pp. 59-64, doi: 10.1109/ICCIS.2015.7274597.

"A Novel Approach for Fusing LIDAR and Visual Camera images in Unstructured environment" International Conference on Advanced Computing and Communication Systems (ICACCS-2017), Jan. 6-7, 2017, Coimbatore, India.

Qingquan Li et al. "A Sensor-Fusion Drivable-Region and Lane-Detection System for Autonomous Vehicle Navigation in Challenging Road Scenarios" IEEE Transactions On Vehicular Technology, vol. 63, No. 2, p. 540-555, Feb. 2014.

"Sebastion Schneider et al. ""Fusing Vision and LIDAR—Synchronization, Correction and Occlusion Reasoning"" 2010 IEEE Intelligent Vehicles SymposiumUniversity of California, San Diego, CA, USA Jun. 21-24, 2010, 6 pages".

Xiangmo Zhao et al. "Fusion of 3D LIDAR and Camera Data for Object Detection in Autonomous Vehicle Applications" IEEE Sensors Journal, vol. 20, No. 9, May 1, 2020, 13 pages.

Hyunggi Jo et al. "New Monte Carlo Localization Using Deep Initialization: A Three-Dimensional LiDAR and a Camera Fusion Approach" vol. 8 2020, School of Electrical and Electronic Engineering, Yonsei University, Seoul 03722, South Korea.

Qingqu Wang et al. "On SLAM Based on Monocular Vision and Lidar Fusion System" 2018 IEEE Csaa Guidance, Navigation and Control Conference (CGNCC), Xiamen, China, 2018, pp. 1-5, doi: 10.1109/GNCC42960.2018.9018987.

Jing Li et al. "OpenStreetMap-Based Autonomous Navigation for the Four Wheel-Legged Robot Via 3D-Lidar and CCD Camera" in IEEE Transactions on Industrial Electronics, vol. 69, No. 3, pp. 2708-2717, Mar. 2022, doi: 10.1109/TIE.2021.3070508.

Mao Shan et al "Probabilistic Egocentric Motion Correction of Lidar Point Cloud and Projection to Camera Images for Moving Platforms" 2020 IEEE 23rd International Conference on Intelligent Transportation Systems (ITSC), Rhodes, Greece, 2020, pp. 1-8, doi: 10.1109/ITSC45102.2020.9294601.

Cesar Debeunne et al. "A Review of Visual-LiDAR Fusion based Simultaneous Localization and Mapping" Published Apr. 7, 2020, retrieved from the internet www.mdpi.com/journal/sensors, Sensors 2020, 20, 2068; doi:10.3390/s20072068.

Shi-Sheng Huang et al. "Lidar-Monocular Visual Odometry using Point and Line Features" 2020 IEEE International Conference on Robotics and Automation (ICRA), Paris, France, 2020, pp. 1091-1097, doi: 10.1109/ICRA40945.2020.9196613.

Johannes Graeter et al. "LIMO: Lidar-Monocular Visual Odometry" 2018 IEEE/RSJ International Conference on Intelligent Robots and Systems (IROS), Madrid, Spain, 2018, pp. 7872-7879, doi: 10.1109/IROS.2018.8594394.

Young-Sik Shin et al. "Direct Visual SLAM using Sparse Depth for Camear-LiDAR System" 2018 IEEE International Conference on Robotics and Automation (ICRA), Brisbane, QLD, Australia, 2018, pp. 5144-5151, doi: 10.1109/ICRA.2018.8461102.

Ben Mildenhall et al. "NeRF: Representing Scenes as Neural Radiance Fields for View Synthesis" 17 pages.

Stephan J. Garbin et al. "FastNeRF: High-Fidelity Neural Rendering at 200FPS" 2021 IEEE/CVF International Conference on Computer Vision (ICCV), Montreal, QC, Canada, 2021, pp. 14326-14335, doi: 10.1109/ICCV48922.2021.01408.

Sara Fridovich-Keil et al. "Plenoxels: Radiance Fields without Neural Networks" 2022 IEEE/CVF Conference on Computer Vision and Pattern Recognition (CVPR), New Orleans, LA, USA, 2022, pp. 5491-5500, doi: 10.1109/CVPR52688.2022.0054.

"Stephen DelMarco et al. ""High-Precision Infantry Training System (HITS)"" Proceedings of the 33rd International Technical Meeting of the Satellite Division of The Institute of Navigation (ION GNSS+ 2020), Sep. 2020, pp. 2579-2589.https://doi.org/10.33012/2020.17741".

"Stephen DelMarco, Helen Webb, Victor Tom ""Automatic Spatial Accuracy Estimation Correlation-based Image Registration"" Proc. SPIE 10993, Mobile Multimedia/Image Processing, Security, and Applications 2019,1099307 (May 13, 2019); doi: 10.1117/12.2518183".

"Stephen DelMarco, Helen Webb, Victor Tom ""Spectrally-shaped Correlation With Application to Image Registration"" Proc. SPIE 10993, Mobile Multimedia/Image Processing, Security, and Applications 2019, 1099306 (May 13, 2019); doi: 10.1117/12.2518171".

* cited by examiner

TIME SYNCHRONIZATION OF OPTICS USING POWER FEEDS

STATEMENT OF GOVERNMENT INTEREST

The invention claimed in this patent application was made with U.S. Government support under contract No. W912CG21C0007 awarded by the U.S. Army. The U.S. Government has certain rights in the invention.

FIELD OF THE DISCLOSURE

The following disclosure relates generally to smart optics, and, more specifically, to smart optics configured for high-accuracy data fusion.

BACKGROUND

Over the years, military weaponry, including the instruments used to assist a soldier in aiming their weapon, has constantly evolved. Initially no instruments, or only very crude instruments, were utilized. Iron sights, which come in a variety of styles, are mechanical in nature, and are typically fixed to the front and rear of a weapon, however, were eventually adopted. While iron sights are still used, they are typically used only as a backup to a more complex, but fragile sight, such as a holographic, red dot, or magnified optic. Such optics are generally mounted to the top of a weapon through a standardized mounting rail, such as a Picatinny rail. Next generation optics, which are sometimes referred to as "Smart Optics" provide additional features above and beyond those found in current aiming instruments and even often add functionality unrelated to aiming of the weapon.

What is needed, therefore, are systems that can be incorporated into or operatively connected to an optic, especially a light or heavy weapon mountable smart optic, such as may be used on an M4 carbine or similar low SWAP-C weapons platforms, that provide advanced features, such as precise synchronization of data obtained by a plurality of sensors, whether on the same or multiple smart optics, preferably without requiring additional hardware, and methods of use thereof.

SUMMARY

One object of the present disclosure is to limit the impact of traditionally "difficult" environments, such as urban canyons, indoors, woods, and GPS-contested tactical environments, on operations.

Another object of the present disclosure is to limit the drift over time between oscillators used across sensors.

Still another object of the present disclosure is to correct for drift that is inherent in IMUs.

One embodiment of the present disclosure provide a smart optic, the smart optic comprising: a mount configured to allow at least a portion of the smart optic to be mounted to a weapon; a time reference comprising a first oscillator, wherein the time reference is configured to output a signal comprising a periodically-repeating feature and time metadata; at least two sensors configured to gather data, each of the at least two sensors comprising secondary oscillators; and at least one processor in operative communication with at least one non-transitory storage medium and each of the at least two sensors; wherein each of the at least two sensors is in operative communication with the time reference and is configured to associate an edge of the periodically-repeating signal with a time conveyed by the time metadata, and wherein each of the at least two sensors is configured to gather data, associate time metadata with the gathered data, and to send the gathered data with time metadata to the at least one processor, and wherein the at least one processor is configured to fuse the data gathered by each of the at least two sensors.

Another embodiment of the present disclosure provides such a smart optic, wherein the time metadata comprises an absolute time.

Still another embodiment of the present disclosure provides such a smart optic, wherein the time reference comprises a GPS or GNSS disciplined oscillator.

Even still another embodiment of the present disclosure provides such a smart optic, wherein the time reference comprises an atomic clock.

Even yet still another embodiment of the present disclosure provides such a smart optic, wherein the time reference comprises a temperature compensated crystal oscillator.

Even still yet another embodiment of the present disclosure provides such a smart optic, wherein the time reference is internal to the smart optic.

Even yet still another embodiment of the present disclosure provides such a smart optic, wherein the signal is overlaid on a power feed to the smart optic and passes through the time reference.

Even another embodiment of the present disclosure provides such a smart optic, wherein the signal overlaid on the power feed comprises an embedded voltage spike, or pulse, at a predetermined cadence.

Still even another embodiment of the present disclosure provides such a smart optic, wherein the pulse comprises a pulse train or specific waveform.

Still even yet another embodiment of the present disclosure provides such a smart optic, wherein a cadence of the pulse is one pulse per second.

Still yet even another embodiment of the present disclosure provides such a smart optic, wherein the power feed is provided by a rail system used to mount the smart optic to a weapon.

Even still another embodiment of the present disclosure provides such a smart optic, wherein the time reference is external to the smart optic.

Even still even another embodiment of the present disclosure provides such a smart optic, further comprising one or more additional time references, with at least one of the additional time references being associated with at least one sensor.

Even still yet even another embodiment of the present disclosure provides such a smart optic, wherein the at least one additional time references are synchronized to the time reference.

Still yet even further embodiments of the present disclosure provide such a smart optic, wherein one of the at least two sensors is an attitude sensor and wherein the attitude sensor is selected from the group consisting of gyroscopes, inertial measurement units, and multi-antenna GPS or GNSS modules.

One embodiment of the present disclosure provides such a system of synchronized smart optics, the system comprising: a first smart optic, at least one additional smart optic, wherein the first and additional smart optic are in operative communication with one another, and wherein one of the first and additional smart optic is configured to synchronize its time reference to the time reference of other.

Another embodiment of the present disclosure provides such a system of synchronized smart optics, wherein data generated by the first smart optic is used to correct for errors on the additional second smart optic.

Even another embodiment of the present disclosure provides such a system of synchronized smart optics, wherein time references used on the first and additional smart optic are disciplined to one another prior to use.

Even still another embodiment of the present disclosure provides such a system of synchronized smart optics, wherein the first and additional smart optic are placed into master/slave relationships, with the time reference of a master smart optic being used to discipline oscillators in slave smart optics.

One embodiment of the present disclosure provides a system of synchronized smart optics, the system comprising: at least two smart optics; and a synchronization module disposed between the at least two smart optics, wherein the smart optics are in operative communication with the synchronization module, and wherein the synchronization module is configured to synchronize the time references of the smart optics.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1A:
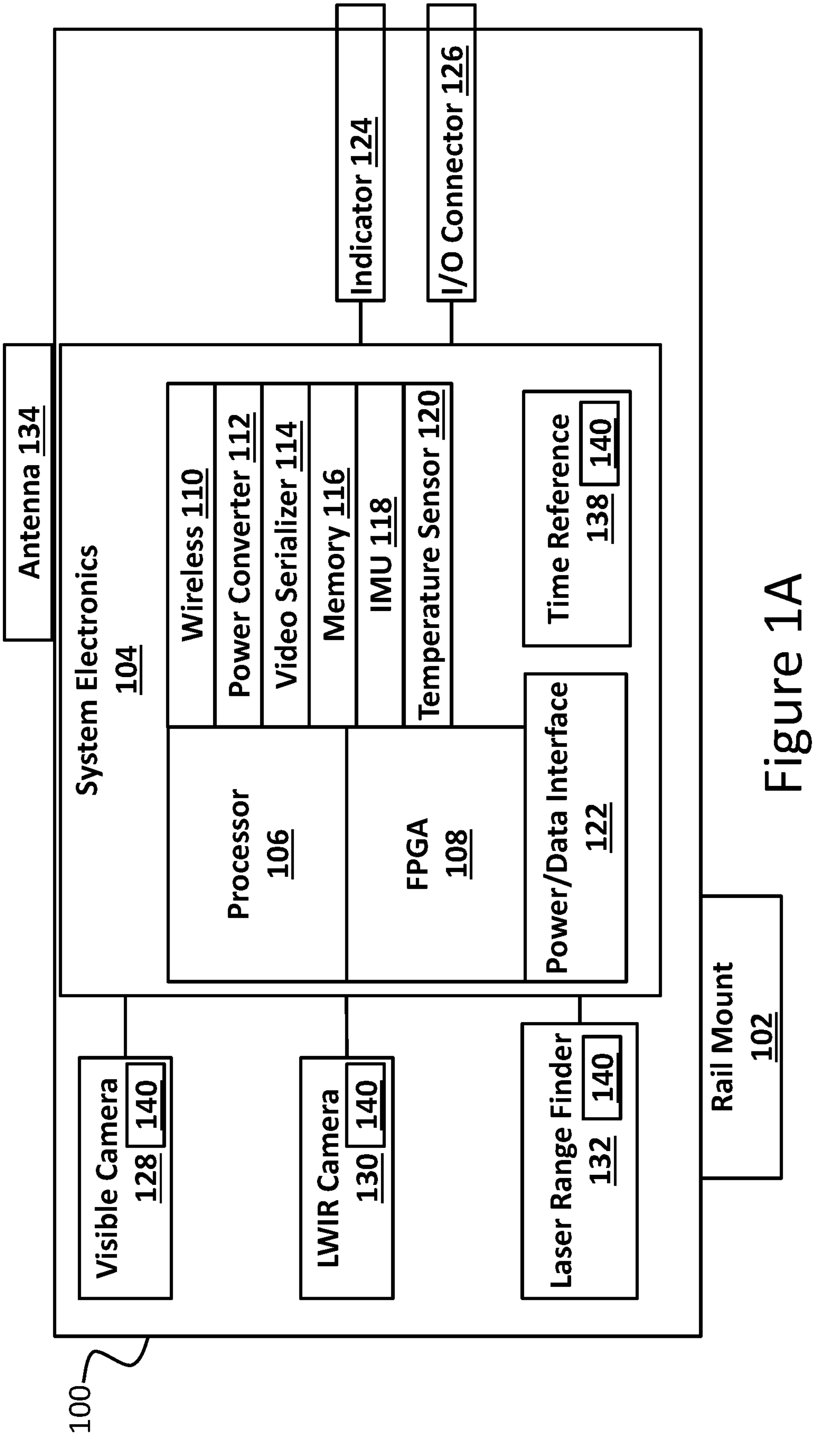
FIG. 1A is a schematic showing a smart optic configured such that onboard sensors are synchronized to a system time, in accordance with embodiments of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Smart optics 100, which offer a wide range of capabilities, may generally be thought of as optics including computing capabilities that utilize at least one passive and/or active sensor that expands the capabilities of a weapon system on which the smart optic 100 is mounted. Smart optics 100 are typically weapon-mounted, include an eyepiece or other element through which a shooter can aim, and can record, and sometimes process details of and/or otherwise interact with, a region surrounding the smart optic 100 using an array of passive and/or active sensors, especially in the direction that the weapon 302 to which the smart optic 100 is attached is pointed.

Current weapon sights and other types of smart optics 100 used by the military can typically supply data, including sensor data such as images, either to a central server or to local storage for storage and/or processing, but cannot mark the various data elements from different sensors on a single device with a time that is sufficiently accurate and consistent between those data elements or data elements on remote smart optics 100 to enable their use in many calculations. Being able to provide a more internally-consistent time stamp for all data elements, whether on a single smart optic 100 or on multiple smart optics 100, would allow the data elements from disparate sensors to be combined, or fused more accurately, which is important in targeting and other collaborative applications, especially where situational awareness is required, enabling their use in more applications.

For example, in recent years, training has included the use of firearms equipped with the ability to fire "eBullets", with the "eBullet" consisting of a laser beam. These firearms can determine whether a shot would have hit a target with reasonable accuracy and provide benefits in terms of safety and cost over the use of standard projectiles. Such systems, however, require relatively large inertial measurement units (IMUs) and weapon-mounted lasers to function, have a range limited by the power of the laser, require line-of-sight visibility to the target, and fail to accurately account for the bullet drop, i.e. simulate a realistic trajectory that would occur with a real projectile.

While vision-only solutions, which identify downrange position offset via changes in image scale, have been attempted in the past, such systems are computationally complex and less precise. These scale-based approaches use a parameter search over scale in which image registration is performed for each scale parameter value. This additional search loop adds significant computational expense which can make deployment to small SWaP-C platforms unrealizable.

Other vision-only solutions use specially-crafted visual features that provide tolerance to scale differences. However, these feature approaches can fail when matching cross-modal imagery, for example IR camera imagery and synthetic range imagery. Feature match failure results from the potentially significantly different feature manifestation due to the different sensor phenomenologies. Machine learning-based approaches can work well, but require massive amounts of training data, and can be brittle when operating on data that has not been seen during training.

In such an application, image data, such as from a visible or Near Wavelength Infrared (NWIR) camera, that is very accurately combined with ranging data, such as from a laser rangefinder, whether from a single or multiple smart optics, or position data supplied by the target itself (e.g. during training exercises) would allow for triangulation of a target, including a calculation of bullet drop, and subsequent determination of a 'hit'. To accomplish such tasks, positional accuracy of less than 1 cm and angular accuracy of less than 1 milliradian is desirable. To obtain such accuracy, especially on small arms where the expected rate of angular change is relatively high, extremely accurate time-stamping of data is required. Without a way to synchronize the data to a consistent global, or system, time to a very high degree of accuracy, fusion of this data, and therefore triangulation, at least to a degree of accuracy that would be acceptable for this application, is not possible.

Before delving into the details of embodiments of the present disclosure, as used herein "system time" should be understood to refer to a synchronized time that is used by sensors on a single smart optic whereas "global time" is a synchronized time that is used by sensors across at least two smart optics, each in accordance with the teachings of the present disclosure.

Additionally, data fusion should be considered the joint analysis of multiple inter-related datasets that provide complementary views of the same phenomenon, which provides more accurate inferences than the analysis of a single dataset can yield. In the context of the present disclosure, an example of data fusion or fusing of data would be the combination of camera and rangefinder data, after being synchronized to one another.

Furthermore, a disciplined oscillator should be understood to refer to an oscillator whose output frequency is continuously adjusted, such as through the use of a phase locked loop (PLL), to agree with an external time reference. For example, a GPS disciplined oscillator (GPSDO) usually consists of a quartz or rubidium oscillator whose output frequency is continuously adjusted to agree with signals broadcast by GPS satellites.

Lastly, synchronization, as used herein, refers to the process of disciplining oscillators, in embodiments to a time reference 138, in embodiments an external time reference 138. This can be done, for instance, by receiving a signal comprising a periodic pulse, such as a voltage spike, and including time metadata and then associating an edge of the pulse with a change in time across elements to be synchronized.

Now referring specifically to the Figures, FIG. 1A is a schematic showing an exemplary embodiment of the smart optic 100, which is configured such that onboard sensors are synchronized to a system time, in embodiments using a highly precise local time reference 138 that, in embodiments is disciplined to an external signal, such as a GPS signal. More specifically, the exemplary smart optic 100 comprises a visible camera 128, a Long-Wavelength Infrared (LWIR) camera 130, and a laser range finder 132 in operative communication with system electronics 104. The system electronics 104 may include a processor 106, Field Programmable Gate Array (FPGA) 108, power/data interface 122, wireless module 110, power converter 112, video serializer 114, memory 116, Inertial Measurement Unit (IMU) 118, and temperature sensor 120. The system electronics 104 may also be in operative communication with an antenna 134, an indicator 124, such as a light viewable by a user, and an Input/Output (I/O) connector 126, which, in embodiments allows charging, calibration, networking, and/or updating the software and/or firmware of the smart optic 100. Each sensor, as well as the processor 106, additionally comprises at least one oscillator 140.

In embodiments, the time reference 138 is in communication with the processor 106 and at least one sensor and is configured to provide data representative of a time or change in time thereto, such that data generated by the sensors can be associated with a highly precise time that does not differ between sensors. In embodiments, the data representative of a time or change in time comprises a signal comprising a regular, repeating pulse and further comprising time metadata. An edge of the pulse (whether leading or trailing) can then be associated with the exact moment of a change in time, such as from one second to the next, allowing the time metadata to be used to mark data generated by the sensors, such as with a timestamp, very accurately. In embodiments, the edge of the pulse is used to discipline oscillators 140 on each of the sensors as well as on the processor 106, ensuring that the time recorded by each element of the system in in agreement. In embodiments, this pulse is used to discipline oscillators 140 substantially continuously, while, in others disciplining is done once or periodically. Embodiments then utilize the time metadata specifying the time associated with the pulse to allow for accurate time-stamping of sensor data. In embodiments, the pulse is generated externally from the smart optic 100 and conveyed thereto via a rail 300 on which the smart optic 100 is configured to be mounted, in embodiments being overlaid on a power feed.

In embodiments, the smart optic 100 is mountable to a rail system 300, such as a Picatinny rail, in embodiments via a rail mount 102.

Figure 1B:
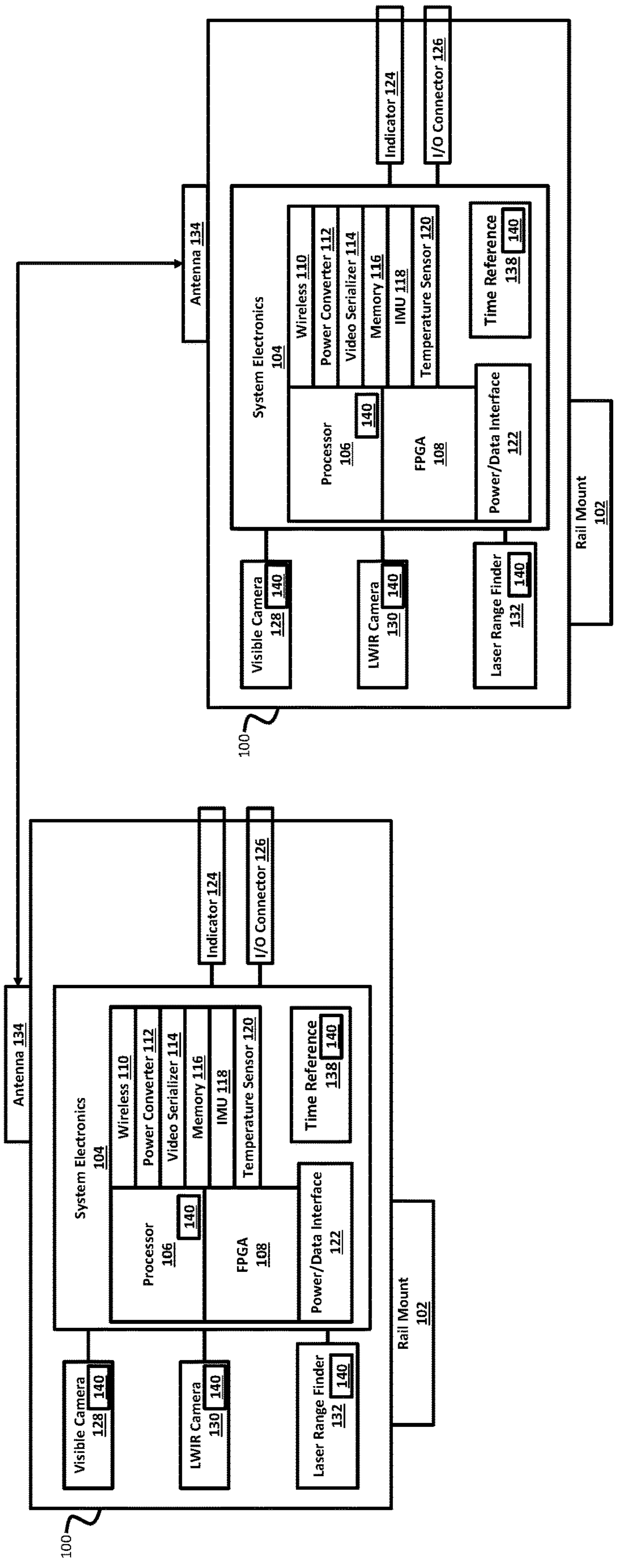
FIG. 1B is a schematic showing multiple smart optics configured such that onboard sensors are synchronized to a system time, with the system times between smart optics also synchronized, creating a global time, in accordance with embodiments of the present disclosure.

FIG. 1B depicts multiple smart optics 100 configured such that onboard sensors are synchronized to a system time, with the system times between smart optics 100 also synchronized, creating a global time that can be used to fuse data obtained by the synchronized smart optics 100.

Figure 1C:
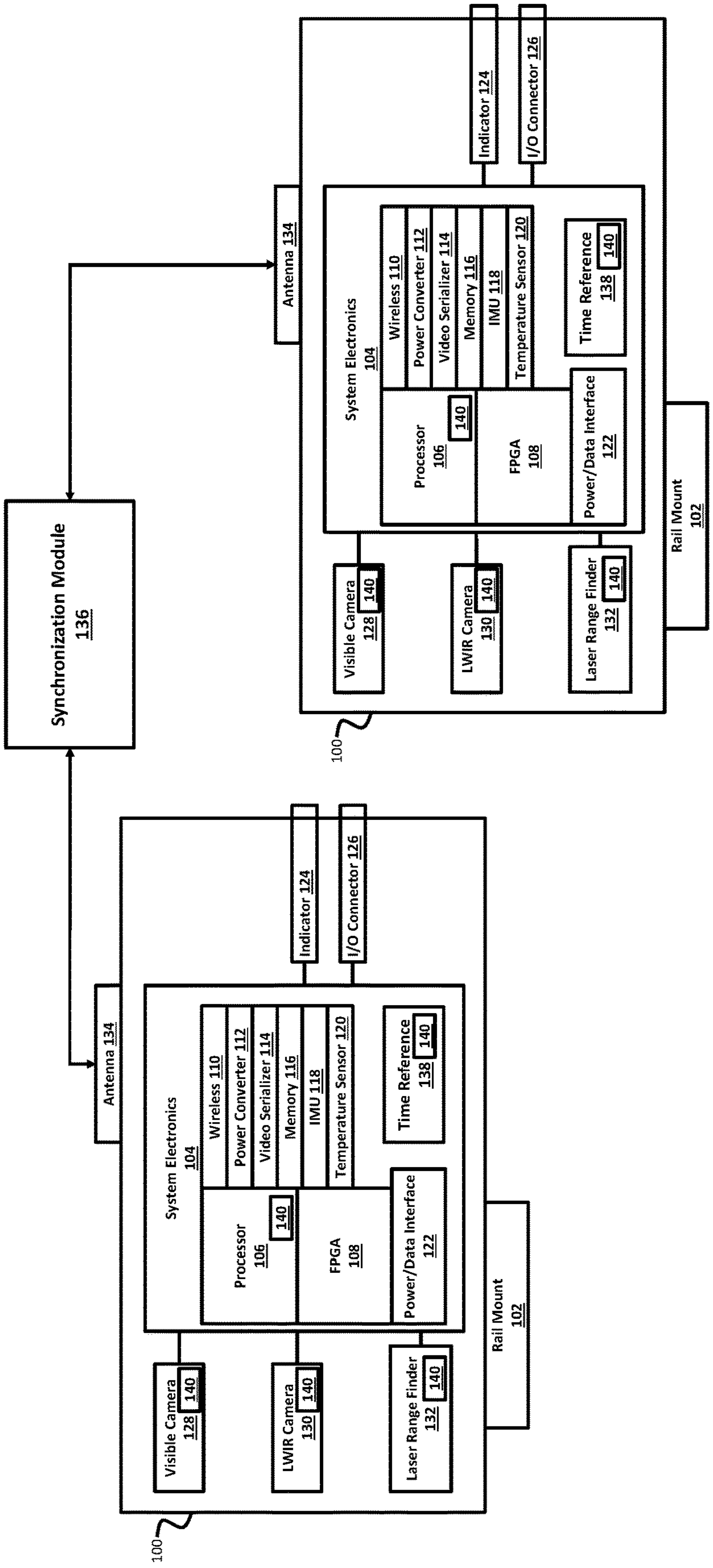
FIG. 1C is a schematic showing multiple smart optics configured such that onboard sensors are synchronized to a system time, with the system times between smart optics also synchronized over a network, creating a global time, in accordance with embodiments of the present disclosure.

FIG. 1C depicts multiple smart optics 100 in operative communication with one another through a synchronization module 136 that is configured to synchronize at least one oscillator, in embodiments the time reference 138, of second and subsequent smart optics 100 to at least one oscillator, in embodiments the time reference 138, of a first smart optic 100, in embodiments using a master/slave relationship. In other embodiments, PTP or similar network time synchronization protocol may be used.

In embodiments, the memory 116 is a non-transitory storage device.

In embodiments, the smart optic 100 includes at least two sensors, a processor 106, a non-transitory storage medium 116, and a time reference 138, which may be local or remote, with the time reference being used to discipline at least one oscillator associated with at least one of the two sensors. In embodiments, multiple processors 106 are used.

These embodiments are only exemplary and various details may differ without departing from the inventive aspects of the present disclosure, as would be known to one of ordinary skill in the art.

Figure 2:
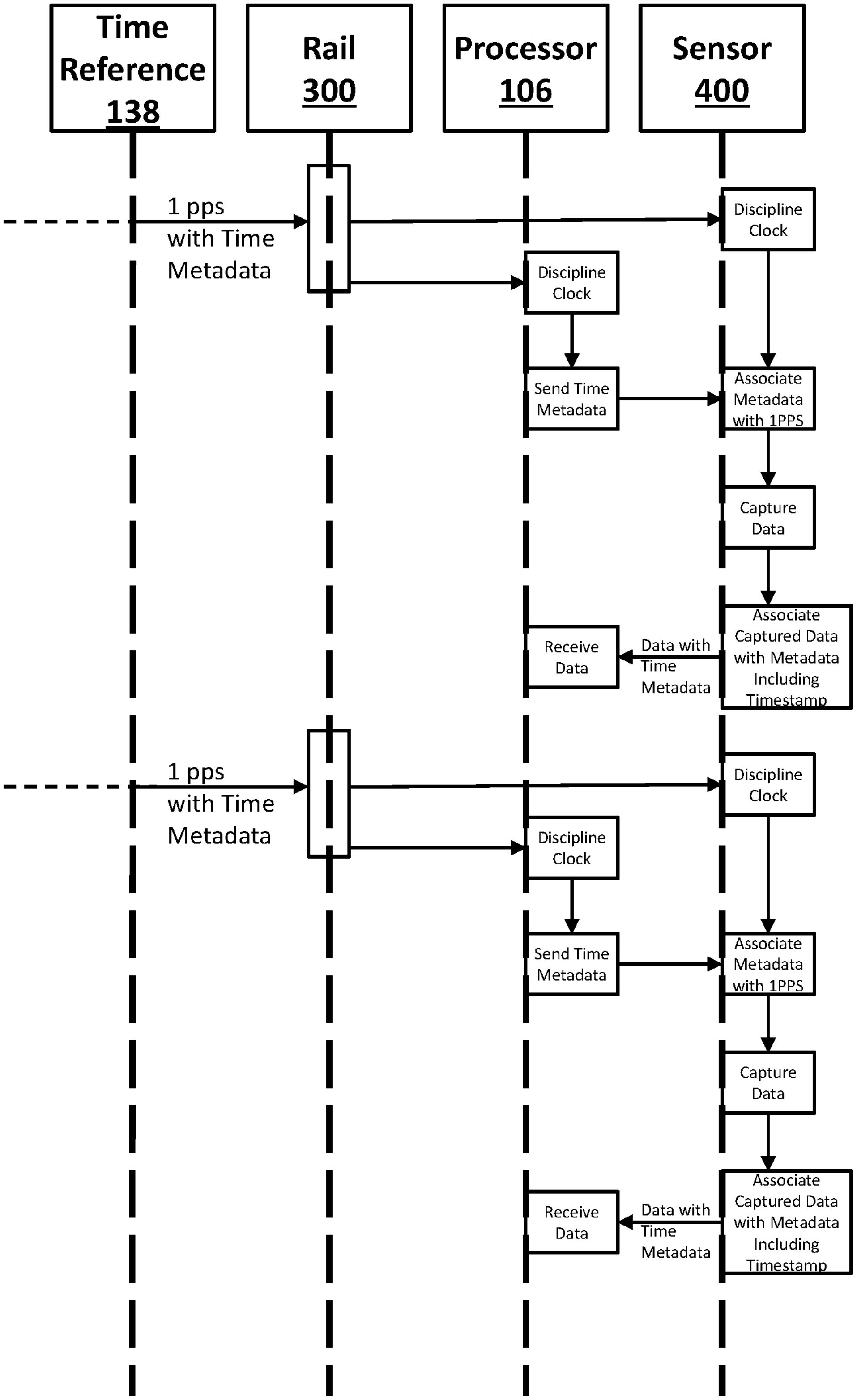
FIG. 2 is a sequence diagram depicting the flow of data and power between system elements, in accordance with embodiments of the present disclosure.

Referring to FIG. 2, a sequence diagram describing depicting the flow of a signal between system elements, in accordance with embodiments of the present disclosure. In FIG. 2, only the time reference 138, rail 300, processor 106, and a sensor 400 are shown for simplicity. More specifically, the time reference 138 is configured to generate and/or act as a passthrough for a signal having a repeating feature at a given cadence, e.g., 1 PPS (Pulse Per Second). For instance, the signal may be a power feed having an embedded voltage spike. Alternatively, the time reference 138 may be configured to generate a signal having such an embedded feature.

The time reference 138 is further configured to embed time metadata into the signal. The signal is then carried, in embodiments by a rail 300, to at least one processor 106, and to at least one sensor 400. The at least one processor 106 and at least one sensor 400 are then configured to use the signal to discipline onboard clocks 140, using the leading or trailing edge of the repeating feature, e.g. pulse, to mark a precise change in time. Once clocks 140 are synchronized, the at least one sensor 140 may be used to capture data, associate the captured data with a specific time, e.g. using a timestamp, and then to send the data with time metadata to the processor 106 or other system element for further processing. This process may be performed between each data capture event, at regular intervals, after a predetermined number of data capture events, or a predetermined number of times.

Figure 3:
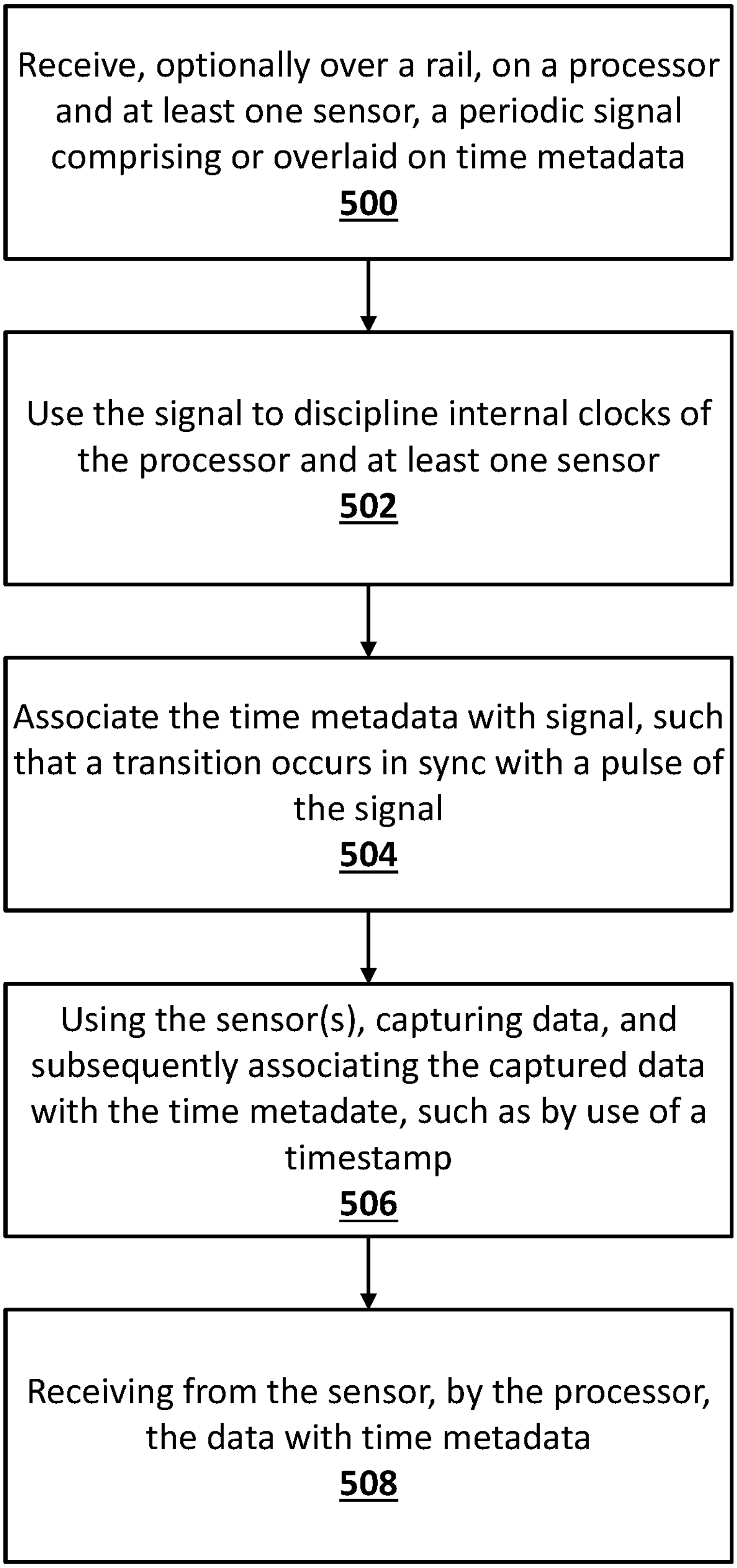
FIG. 3 is a flowchart describing operation of the system, in accordance with embodiments of the present disclosure.

In embodiments, the processor 106 is configured to send time metadata to the at least one sensor 400, which the at least one sensor is configured to associate with the repeating feature. FIG. 3 is a flowchart describing a method of operation of the system, in accordance with embodiments of the present disclosure. The method comprises: receiving, optionally over a rail, on a processor and at least one sensor, a periodic signal comprising or overlaid on time metadata 500; using the signal to discipline internal clocks of the processor and at least one sensor 502; associating the time metadata with the signal, such that a transition occurs in sync with a pulse of the signal 504; using the sensor(s), capturing data, and subsequently associating the captured data with the time metadata, such as by use of a timestamp 506; and receiving from the sensor, by the processor, the data with time metadata 508.

Figure 4:
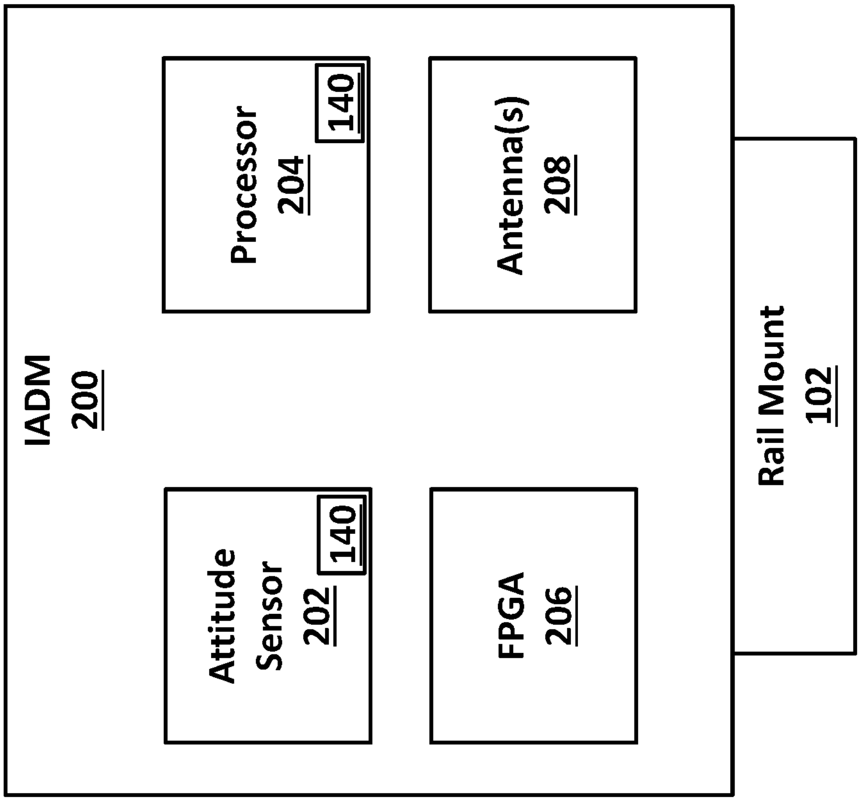
FIG. 4 is a schematic showing an Inertial Attitude Determination Module (IADM), in accordance with embodiments of the present disclosure.

Now referring to FIG. 4, FIG. 4 depicts an IADM 200 comprising an attitude sensor 202, processor 204, FPGA 206, and one or more antenna(s) 208, with the IADM 200 being configured to provide attitude data to the smart optic 100, allowing the pointing direction of a weapon to which the smart optic 100 is attached to be determined. In embodiments, this function is carried out by an IMU 118 that is integral to the smart optic 100 while, in still other embodiments, it is external to the smart optic 100. Embodiments of the IADM 200 may further comprise elements shown in the figures as being internal to the smart optic 100.

In embodiments, the IADM 200 is mountable to a rail system 300 and includes a rail mount 102. In embodiments, the IADM 200 is configured to be in operative communications, which may be wired or wireless, with the smart optic 100.

In embodiments, the attitude sensor 202 comprises an inertial measurement unit (IMU) or a gyroscope 202 while, in other embodiments, it comprises a GPS or GNSS module 202 with multiple antennas 208 that allow attitude to be inferred. Additional configurations, as would be apparent to one of ordinary skill in the art, are also possible.

In embodiments, the IADM 200 is not used and attitude is determined using elements, such as an attitude sensor 202, for example an IMU 118, gyroscope, GPS, or GNSS module 202, disposed in or outside of in the smart optic 100.

Figure 5:
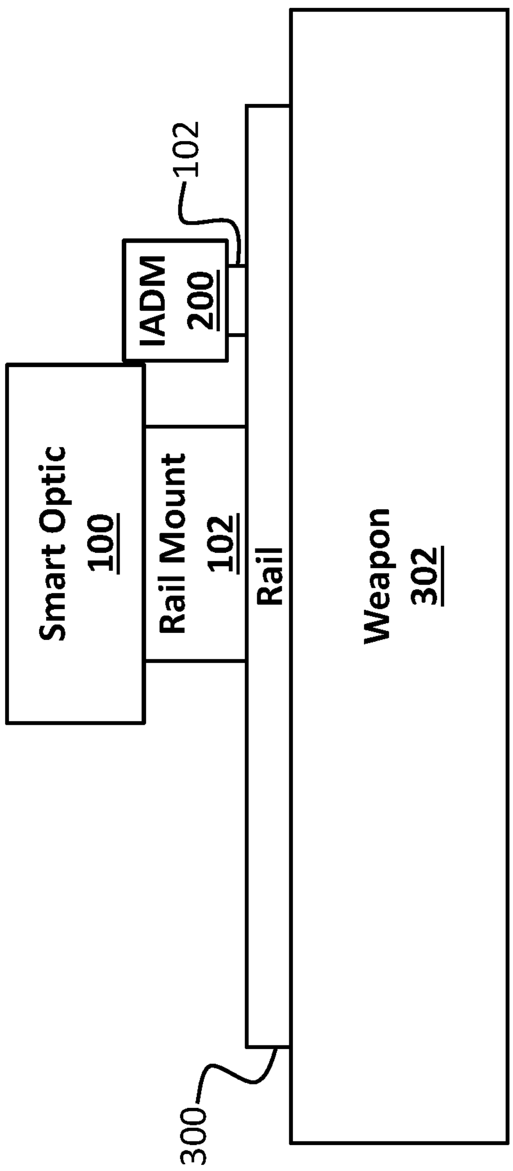
FIG. 5 is a schematic showing the smart optic and IADM mounted to a light weapon via a rail, in accordance with embodiments of the present disclosure.

Now referring to FIG. 5, a smart optic 100 and IADM 200, both in accordance with embodiments of the present disclosure, are shown mounted to a weapon 302 via rail mounts 102, which, in embodiments is a 'smart' rail system 300 configured to embed a voltage spike at a given cadence, e.g., 1 PPS (Pulse Per Second), which is detected and used to discipline a time reference 138, or clock, inside the smart optic 100, such as is schematically depicted in FIG. 2 and further described in FIG. 3.

In the embodiments shown in FIGS. 4 and 5, the use of a GPS Disciplined Oscillator (GPSDO) or similar on each smart optic 100 allows absolute times to be used on each device and when fusing data therefrom. In other embodiments, a TCXO is used on each smart optic 100, with each TCXO being calibrated to the same time prior to use. In still further embodiments the time reference 138 comprises a GPSDO on one smart optic 100 whose time is synchronized to other smart optics 100 using the techniques described herein, such as the use of the Precision Time Protocol (PTP) or other determination of and compensation for network delay(s).

In embodiments where only a single smart optic 100 is used, the time used as a reference time may be a relative time (e.g. time since boot), rather than an absolute time.

In embodiments, the smart optic 100 is capable of being mounted to light and/or heavy weapons 302, such as the M4 carbine in common use by infantry. In embodiments, the smart optic 100 is mounted to the weapon 302 via a universal mounting system, such as a rail system 300, in embodiments a Picatinny rail.

Exemplary embodiments of the present disclosure provide the ability to time synchronize the data output by at least two sensors on a single smart optic 100, in embodiments via a shared time reference 138, which may be an internal or external reference, such as an atomic clock, a Temperature Compensated Crystal Oscillator (TCXO), a Global Positioning System Disciplined Oscillator (GPSDO), or any other oscillator or time reference 138 of sufficient accuracy (oscillators may also be referred to herein as clocks). This time reference 138 is then used in conjunction with a pulse train to associate a very precise time with data generated by each of the at least two sensors, allowing such data to be combined with a very high degree of accuracy. In embodiments, the time reference 138 is used to apply a very precise time stamp to metadata associated with the data generated by each of the at least two sensors.

In embodiments, at least one time reference 138 is external to the smart optic 100.

In embodiments, additional time references 138 may be used, with each time reference 138 associated with at least one sensor. In embodiments, the additional time reference(s) 138 are synchronized, or disciplined to, a specific time reference 138.

In embodiments, a signal associated with the time reference 138 is overlaid on an existing input to the smart optic 100, such as a power feed. In such embodiments, the signal comprises a voltage spike at a given cadence, e.g., 1 PPS (Pulse Per Second) embedded in a power feed, with an edge of the voltage spike being configured to exactly correspond to a change in the time reference 138 (e.g. a change from one second to the next). This pulse edge can then be detected by the smart optic 100 and, in embodiments after combination with metadata, internal, or external data, provide an absolute time associated with a previous event (e.g. the previous pulse edge) that can be used to precisely synchronize the timestamp(s) associated with data generated by the at least two of the sensors on the smart optic 100.

Such features and techniques allow sensor data obtained from such a smart optic 100 to be very accurately fused together and thereby expands the potential use cases thereof. For example, such a configuration allows the combination of laser range finder 132 data with camera data, such as a visible camera 128 or Long Wavelength Infrared (LWIR) camera 130, to be used in place of laser painting for smart munitions, as is currently done. It also allows target location information provided by networked smart optics 100 to be combined with information such as attitude, pointing direction, barometric data, relative humidity, temperature, and trigger-pull information from a targeting smart optic 100 to be used to determine a hit or miss in training exercises, allowing factors such as bullet drop to be taken into account and for distinctions between cover and to be made. In embodiments, smart optics 100 between a shooter and target are configured to provide additional information that could effect where a bullet will impact, such as temperature, atmospheric pressure, wind speed and/or direction, humidity, etc.

In embodiments, smart optics 100 used in training exercises do not require a visible line-of-sight to a target to determine if a shot would have impacted the target; targets occluded by vehicles or foliage may still be engaged, and hit depending upon the caliber of the projectiles using a knowledge of the materials between the shooter and target. In embodiments, cover or concealment located between the shooter and target is automatically identified as such depending on what type of weapon and/or what type of projectiles the shooter is equipped with (for training purposes, these could simply be programmed into the smart optic 100 before use or training magazines that are associated with a specific type of ammunition could be configured to communicate with the smart optic 100, allowing it to determine what type of ammunition should be used for calculations throughout a training exercise).

In embodiments, multiple smart optics 100 are synchronized to a global time. In such embodiments, camera and laser range finder 132 data from individual soldiers carrying, for example, light weapons 302, e.g. an M4, equipped with smart optics 100 in accordance with embodiments of the present disclosure can be combined, in embodiments over wireless and/or wired networks, which in some cases are decentralized and/or peer-to-peer, to perform collaborative triangulation and targeting functions.

In embodiments, the time reference 138, which, in embodiments, is a GPS or GNSS disciplined oscillator (GPSDO or GNSSDO), is used on each of a plurality of smart optics 100 to discipline oscillators thereon and establish a consistent global time therebetween. In such embodiments, each time reference may be disciplined to one another prior to use, at regular intervals, at each opportunity (e.g. when a GPS signal is available), or as otherwise needed.

In embodiments, the time reference 138 of each smart optic 100 comprises an atomic clock that is used directly or to discipline oscillators on the smart optic(s) 100 and provide a consistent global time therebetween, in embodiments using a master/slave relationship. In such embodiments, each atomic clock may be disciplined to one another prior to use, at regular intervals, or as otherwise needed.

In embodiments, the time reference 138 of each smart optic 100 comprises a Temperature Compensated Crystal Oscillator (TCXO) that is used directly or to discipline oscillators on the smart optic(s) 100 and provide a consistent global time therebetween, in embodiments using a master/slave relationship. In such embodiments, each TCXO may be disciplined to one another prior to use, at regular intervals, or as otherwise needed.

In embodiments, wireless communications between smart optics 100 are used to synchronize the smart optics 100 using a synchronization module 136 disposed between smart optics 100. In embodiments, wireless communications between smart optics 100 comprise ad-hoc or peer-to-peer networks.

In embodiments, a network protocol, such as Network Time Protocol (NTP) or Precision Time Protocol (PTP), as would be known to one of ordinary skill in the art, may be used to determine the transmission delay between networked devices in real-time and to synchronize the time between smart optics 100.

In embodiments, data exchanged between devices is done so using a blockchain, which, in embodiments, is encrypted.

In embodiments, the power feed is provided by a 'smart' rail system 300, which, in the context of the present disclosure, should be understood to be a rail system 300, such as a Picatinny rail, that provides power at each potential mounting point. An example of such a smart rail system is the T-Worx Intelligent RailR and Rail Operating System (ROS), which conforms to U.S. Army Smart Rail requirements and NATO STANAG 4740.

In embodiments, an electrical pulse is transmitted through the rail system 300 to the smart optic 100, providing an accurate time reference that, in embodiments, is used to discipline the time reference 138 of each smart optic 100 while, in other embodiments, the time reference 138 is used to discipline oscillators associated with individual sensors or groups thereof associated with each smart optic 100.

In embodiments, the pulse is a single pulse while, in other embodiments, it is a pulse train or specific waveform.

In embodiments, metadata providing a time associated with a pulse, such as National Marine Electronics Association (NMEA) messages sent with GPS data, is transmitted separately from the pulse.

In embodiments, time references 138 and/or oscillators are disciplined prior to use while, in other embodiments, they are disciplined on a continuous or regular basis or when the opportunity to do so otherwise arises.

In embodiments, smart optics 100 are placed into master/slave relationships, with the master smart optic 100 being used to discipline oscillators in slave smart optics 100.

In embodiments, local data, i.e. data generated by a single smart optic 100, is used to correct for errors on a second or subsequent smart optic 100. In embodiments, this is done by adding an offset to a time associated with data received by the second or subsequent smart optic 100. For instance, where the smart optics 100 are able to capture at least a portion of the same data and/or have a clear line of sight to one another, the overlapping data can be matched up and a time associated with the data on a second or subsequent smart optic 100 can then be offset or otherwise adjusted so that the time at which the overlapping data observed by the smart optics 100 is associated with a consistent time across the smart optics 100.

In embodiments, the use of such a rail system 300 to discipline a time reference 138, such as an oscillator or clocks, associated with one or more sensors within a smart optic 100 allows the smart optic 100 itself to utilize fewer components, thus simplifying the design while reducing size, weight, and power requirements (SWaP).

In embodiments, the rail system 300 is configured for communications and is used to synchronize voltage spikes in its power feed at a given cadence across a plurality of rails 300 and/or other devices.

In embodiments, the smart optic 100 is wholly contained within a unitary housing while, in other embodiments, it is distributed amongst a plurality of modules, which may or may not be networked or located in the same location (e.g. a part of the system described herein may be remote from the user/available over a network).

In embodiments, the modules and techniques described herein may be distributed over multiple devices, including over a network; the elements described herein do not need to coexist within a single unitary housing to function as described herein.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A smart optic, the smart optic comprising:

a mount configured to allow at least a portion of the smart optic to be mounted to a weapon;

a time reference comprising a first oscillator, wherein the time reference is configured to output a signal comprising a periodically-repeating feature and time metadata;

at least two sensors configured to gather data, each of the at least two sensors comprising secondary oscillators; and at least one processor in operative communication with at least one non-transitory storage medium and each of the at least two sensors;

wherein each of the at least two sensors is in operative communication with the time reference and is configured to associate an edge of the periodically-repeating signal with a time conveyed by the time metadata, and wherein each of the at least two sensors is configured to gather data, associate time metadata with the gathered data, and to send the gathered data with time metadata to the at least one processor, and wherein the at least one processor is configured to fuse the data gathered by each of the at least two sensors.

2. The smart optic of claim 1, wherein the time metadata comprises an absolute time.

3. The smart optic of claim 1, wherein the time reference comprises a GPS or GNSS disciplined oscillator.

4. The smart optic of claim 1, wherein the time reference comprises an atomic clock.

5. The smart optic of claim 1, wherein the time reference comprises a temperature compensated crystal oscillator.

6. The smart optic of claim 1, wherein the time reference is internal to the smart optic.

7. The smart optic of claim 1, wherein the signal is overlaid on a power feed to the smart optic and passes through the time reference.

8. The smart optic of claim 7, wherein the signal overlaid on the power feed comprises an embedded voltage spike, or pulse, at a predetermined cadence.

9. The smart optic of claim 8, wherein the pulse comprises a pulse train or specific waveform.

10. The smart optic of claim 7, wherein a cadence of the pulse is one pulse per second.

11. The smart optic of claim 7, wherein the power feed is provided by a rail system used to mount the smart optic to a weapon.

12. The smart optic of claim 1, wherein the time reference is external to the smart optic.

13. The smart optic of claim 1, further comprising one or more additional time references, with at least one of the additional time references being associated with at least one sensor.

14. The smart optic of claim 13, wherein the at least one additional time references are synchronized to the time reference.

15. The smart optic of claim 1, wherein one of the at least two sensors is an attitude sensor and wherein the attitude sensor is selected from the group consisting of gyroscopes, inertial measurement units, and multi-antenna GPS or GNSS modules.

16. A system of synchronized smart optics, the system comprising:

a first smart optic in accordance with claim 1, at least one additional smart optic in accordance with claim 1, wherein the first and additional smart optic are in operative communication with one another, and wherein one of the first and additional smart optic is configured to synchronize its time reference to the time reference of other.

17. The system of claim 16, wherein data generated by the first smart optic is used to correct for errors on the additional second smart optic.

18. The system of claim 16 wherein time references used on the first and additional smart optic are disciplined to one another prior to use.

19. The system of claim 16 wherein the first and additional smart optic are placed into master/slave relationships, with the time reference of a master smart optic being used to discipline oscillators in slave smart optics.

20. A system of synchronized smart optics, the system comprising:

at least two smart optics in accordance with claim 1; and a synchronization module disposed between the at least two smart optics, wherein the smart optics are in operative communication with the synchronization module, and wherein the synchronization module is configured to synchronize the time references of the smart optics.

* * * * *